May 16, 1944.  C. L. EKSERGIAN  2,349,220
WHEEL HUB
Filed July 21, 1943  2 Sheets-Sheet 1

Carolus L. Eksergian
INVENTOR
BY John P. Tarbox
ATTORNEY

May 16, 1944.  C. L. EKSERGIAN  2,349,220
WHEEL HUB
Filed July 21, 1943  2 Sheets-Sheet 2

Carolus L. Eksergian
INVENTOR
BY John P. Taylor
ATTORNEY

Patented May 16, 1944

2,349,220

UNITED STATES PATENT OFFICE 2,349,220

WHEEL HUB

Carolus L. Eksergian, Detroit, Mich., assignor to Budd Wheel Company, Philadelphia, Pa., a corporation of Pennsylvania Application July 21, 1943, Serial No. 495,591

5 Claims. (Cl. 301—105)

This invention relates to wheel hubs such as are commonly employed in connection with demountable wheels and particularly to hubs for use on military vehicles.

The use of forgings for hubs of this type has heretofore been preferred because of the inherent strength of a forging as compared, for example, to a casting, but the present demand is so great as to more than overtax the country's facilities for producing forgings for this purpose. On the other hand, the use of castings as heavy duty wheel hubs has not heretofore proven satisfactory because of their tendency to crack and fail when in use. One object of this invention is to provide a cast wheel hub of improved design capable of withstanding without failure the heavy stresses involved in its use.

A further object is to provide a wheel hub of such design and configuration as to absorb the stresses set up in use particularly when in use with deeply dished wheels, without requiring heavy concentrations of material at the points of stress, thereby gaining adequate strength for heavy duty while retaining relatively light weight.

These and other objects are accomplished by the present invention, one embodiment of which is shown in the accompanying drawings in which.

Figure 1:
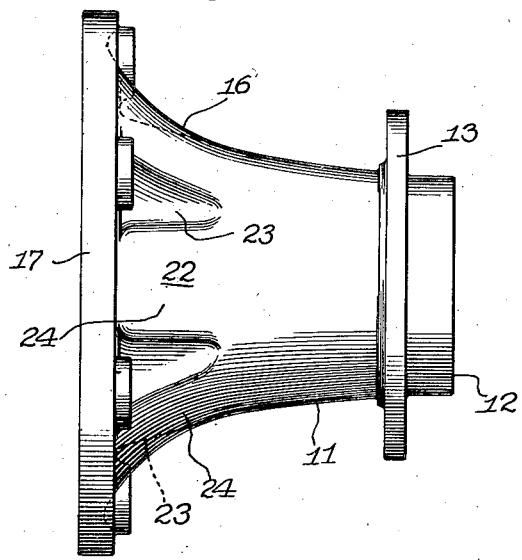
Fig. 1 is a side elevation of a cast wheel hub constructed in accordance with one embodiment of this invention.

In the manufacture of wheel hubs a point of weakness is the junction between the cylindrical body portion of the hub and the hub flange, that is, the bolting on flange to which a demountable wheel is secured. Under loading, in use, the flange tends to deflect into a somewhat conical form, and most hub failures come from this coning tendency which ultimately develops a circumferential crack around the hub. Merely increasing the thickness of the casting at this point does not solve the problem because what may be gained by mere increase in thickness is lost by the increased porosity of the thicker casting. For this reason, it has heretofore been customary to provide radial reinforcing ribs between the bolting on flange and the cylindrical body portion of the hub, but such structures have not proved entirely satisfactory. In cooling such castings, cracks are likely to develop, or points of high stress are produced which result in failures when in use.

In the present invention these and other disadvantages and weaknesses are overcome by eliminating the radial reinforcing flanges and forming the annular body portion of the hub with a flaring configuration which merges at its outer end into the bolting on flange and which is of sinuous cross-section in a transaxial plane, the sinuosity being such as to provide broad, circumferentially extending shoulders connected by generally radial sections to inner circumferentially extending connecting portions. Among other advantages, this sinuous cross-section, in effect, provides a relatively wide base for supporting the bolting on flange and resisting its coning tendency in use, while eliminating variations in sectional thickness as well as junctions or shoulders of angular form.

As illustrated, the present invention comprises a cast wheel hub 11 having an annular body portion 12 which is substantially cylindrical at one end and which is provided with a circular flange 13 for supporting a brake drum 14 secured to the flange by suitable connecting bolts 15.

Adjacent the cylindrical portion 12, the hub is formed with a tapered portion 16 which flares outwardly to a bolting on flange 17 formed on the outboard end of the hub for supporting a wheel 18 through supporting studs 19 and clamping nuts 20 of conventional form. Any suitable rim 21 can be secured in any desired manner on the wheel 18.

Figure 2:
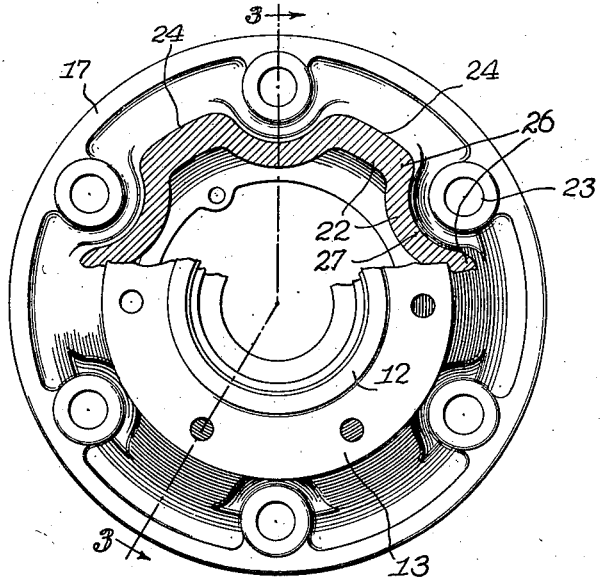
Fig. 2 is a sectional view on the line 2—2 of Fig. 3.

Adjacent the flange 17, the tapered portion 16 of the hub is formed with a sinuous configuration 22 which in a transaxial plane approximates in form, as illustrated, a succession of channel bars placed in alternately reversed arrangement, see Fig. 2. This results in the tapered portion of the hub having a series of broad, circumferentially extending, stress absorbing shoulders 24 connected by generally radial sections 26 to inner circumferential connecting portions 27. Bolt openings 23 are provided to receive the studs 19.

The tapered construction provides a large diameter outside the inner bearing support 25, and the reinforcing shoulders sweep outwardly to a diameter at least as great as the diameter of the bolt centers.

Figure 3:
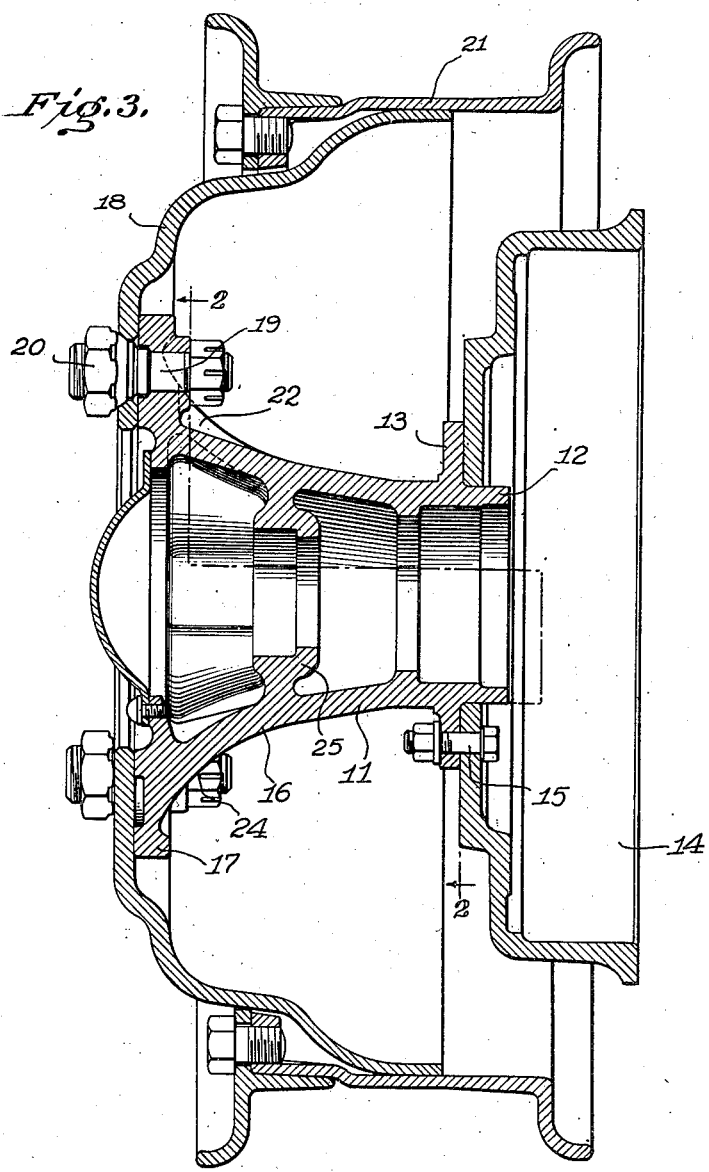
Fig. 3 is a transverse sectional view of the hub showing the same operatively supporting a brake drum and a demountable wheel, the section being on the line 3—3 of Fig. 2.

As best seen in Figs. 1 and 3, the shoulders 24 merge into the hub flange and the slope of the shoulders is such as to insure transversely applied loads being carried into the body of the hub proper in the form of compression stresses which a cast hub is best able to withstand. The taper of the hub combined with the sinuous conformation insures these stresses being distributed around the material of the hub evenly to avoid such an uneven distribution as would produce peak stresses at concentrated points in the hub and result in failures. At the same time, the sinuous cross-section gives the effect of a wide base supporting the flange 17 to resist its tendency to cone under load, without increasing the section thickness and without forming angular reinforcements. Also, the flange 17 circumferentially strengthens the corrugated rim formed by the sinuous hub, strengthening its resistance to circumferential stresses. It will be seen that the flaring hub merges into the bolting-on flange, the broad shoulders 24 merging into the outer rim of the flange while the inner, circumferential portions 22 merge into the inner portion of the bolting on flange, thus providing the wide base referred to.

It will be apparent that the specific details of the invention described can be variously modified and adapted within the scope of the appended claims.

What is claimed is:

1. A cast wheel hub having a tapered body portion provided with a bolting on flange at the large end thereof, the wall of said hub adjacent said flange being tapered and of sinuous cross-section in a transaxial plane approximating a succession of channel bars in alternately reversed arrangement.

2. A tapered cast wheel hub having a circular cross-section at the smaller end and a brake drum flange adjacent said end, a bolting on flange at the opposite end of said hub and a tapered hub wall of sinuous cross-section extending from a point adjacent said brake drum flange, flaring outwardly and merging into said bolting on flange, said sinuous conformation providing rounded, spaced stress absorbing shoulders of relatively considerable breadth merging into the rim of said bolting on flange.

3. A tapered cast wheel hub comprising an annular body portion having a brake drum flange adjacent the smaller end and a bolting on flange for wheels at the larger end thereof, a tapered portion extending from a point adjacent said brake drum flange outwardly, an inner bearing support formed within said tapered portion, said tapered portion having in part a sinuous cross-section flaring outwardly to said bolting on flange approximating a succession of channel bars in alternately reversed arrangement providing spaced, rounded stress-absorbing shoulders of relatively considerable breadth merging into the rim of said bolting on flange.

4. A tapered cast wheel hub comprising an annular body portion having a brake drum flange adjacent the smaller end and a bolting on flange for wheels at the larger end thereof, a tapered portion extending from a point adjacent said brake drum flange, flaring outwardly and merging into said bolting-on flange, said tapered portion adjacent said bolting on flange having a sinuous cross-section providing spaced, broad circumferentially extending shoulders connected by generally radial sections to spaced inner circumferentially extending connecting portions, said configuration forming, in effect, a wide base for supporting said bolting on flange and resisting the coning tendency thereof in use.

5. A tapered cast wheel hub comprising an annular body portion having a brake drum flange adjacent the smaller rim and a bolting on flange for wheels at the larger end thereof, a tapered portion extending from a point adjacent said brake drum flange, flaring outwardly and merging into said bolting on flange, said tapered portion adjacent said bolting on flange and a sinuous cross-section providing spaced, broad circumferentially extending shoulders merging into the rim of said bolting on flange and connected by generally radial sections to spaced inner circumferentially extending connecting portions which merge into the inner portion of said flange, said configuration thereby forming a wide base for supporting said bolting on flange and resisting the coning tendency thereof in use.

CAROLUS L. EKSERGIAN.